April 29, 1952   F. E. SMITH   2,594,594
ALTERNATING CURRENT RECTIFIER
Filed Sept. 15, 1948   8 Sheets-Sheet 2

INVENTOR.
FRANK E. SMITH
BY
John L. Seymour
ATTORNEY

April 29, 1952 F. E. SMITH 2,594,594
ALTERNATING CURRENT RECTIFIER
Filed Sept. 15, 1948 8 Sheets-Sheet 3

INVENTOR.
FRANK E. SMITH
BY
John L. Seymour
ATTORNEY

April 29, 1952     F. E. SMITH     2,594,594
ALTERNATING CURRENT RECTIFIER
Filed Sept. 15, 1948     8 Sheets-Sheet 4
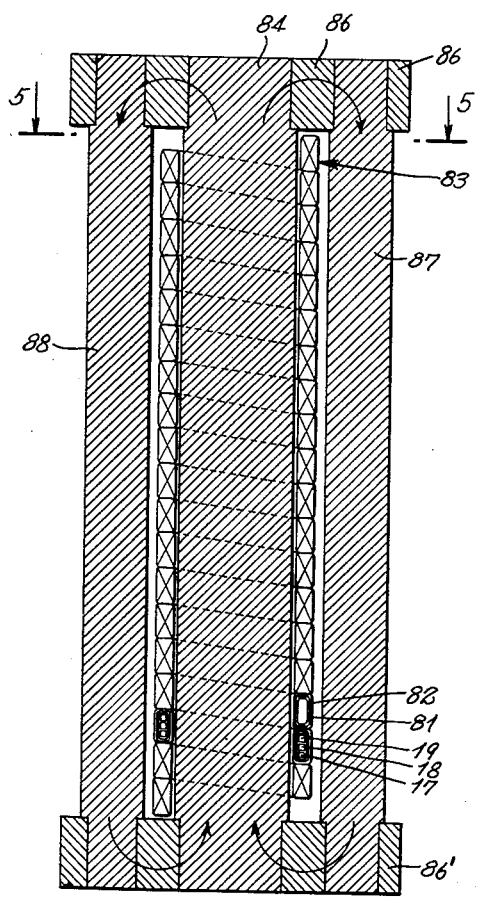
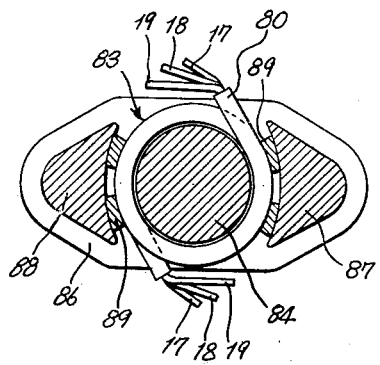
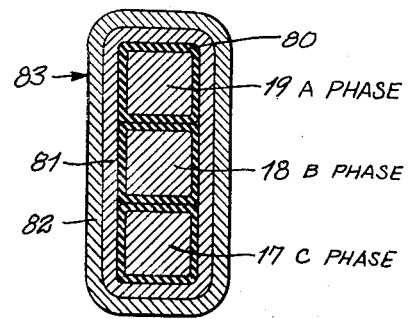
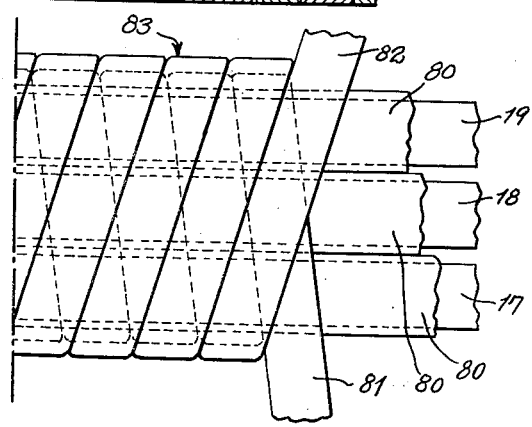
INVENTOR.
FRANK E. SMITH
BY
John R. Seymour
ATTORNEY April 29, 1952 F. E. SMITH 2,594,594
ALTERNATING CURRENT RECTIFIER
Filed Sept. 15, 1948 8 Sheets-Sheet 5

INVENTOR.
FRANK E. SMITH
BY
John L. Seymour
ATTORNEY

April 29, 1952  F. E. SMITH  2,594,594
ALTERNATING CURRENT RECTIFIER
Filed Sept. 15, 1948  8 Sheets-Sheet 6
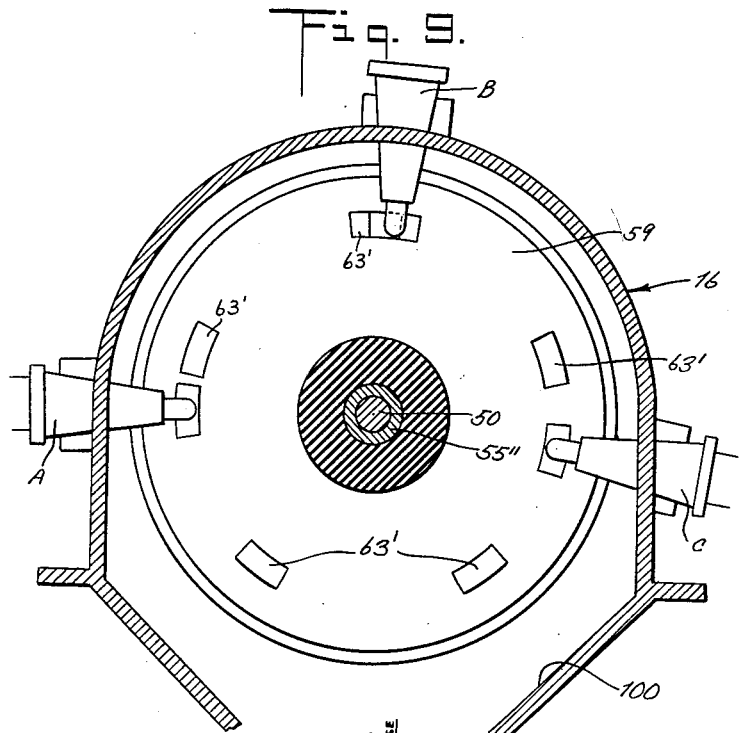
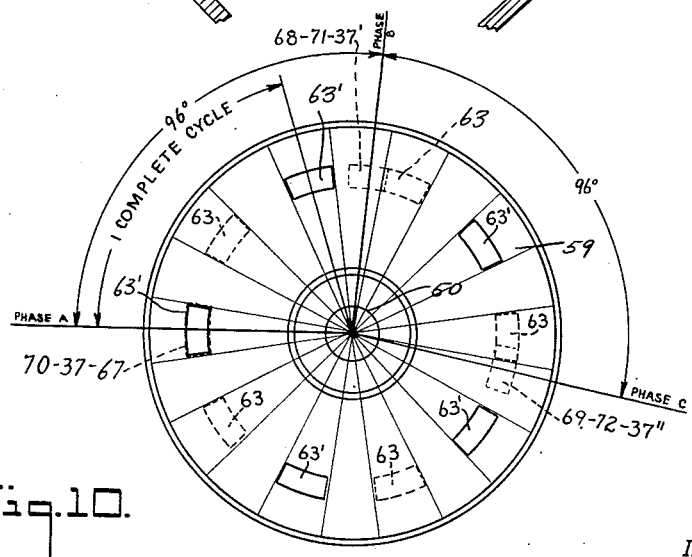
INVENTOR.
FRANK E. SMITH
BY
John R. Seymour
ATTORNEY April 29, 1952
F. E. SMITH
2,594,594
ALTERNATING CURRENT RECTIFIER
Filed Sept. 15, 1948
8 Sheets-Sheet 7
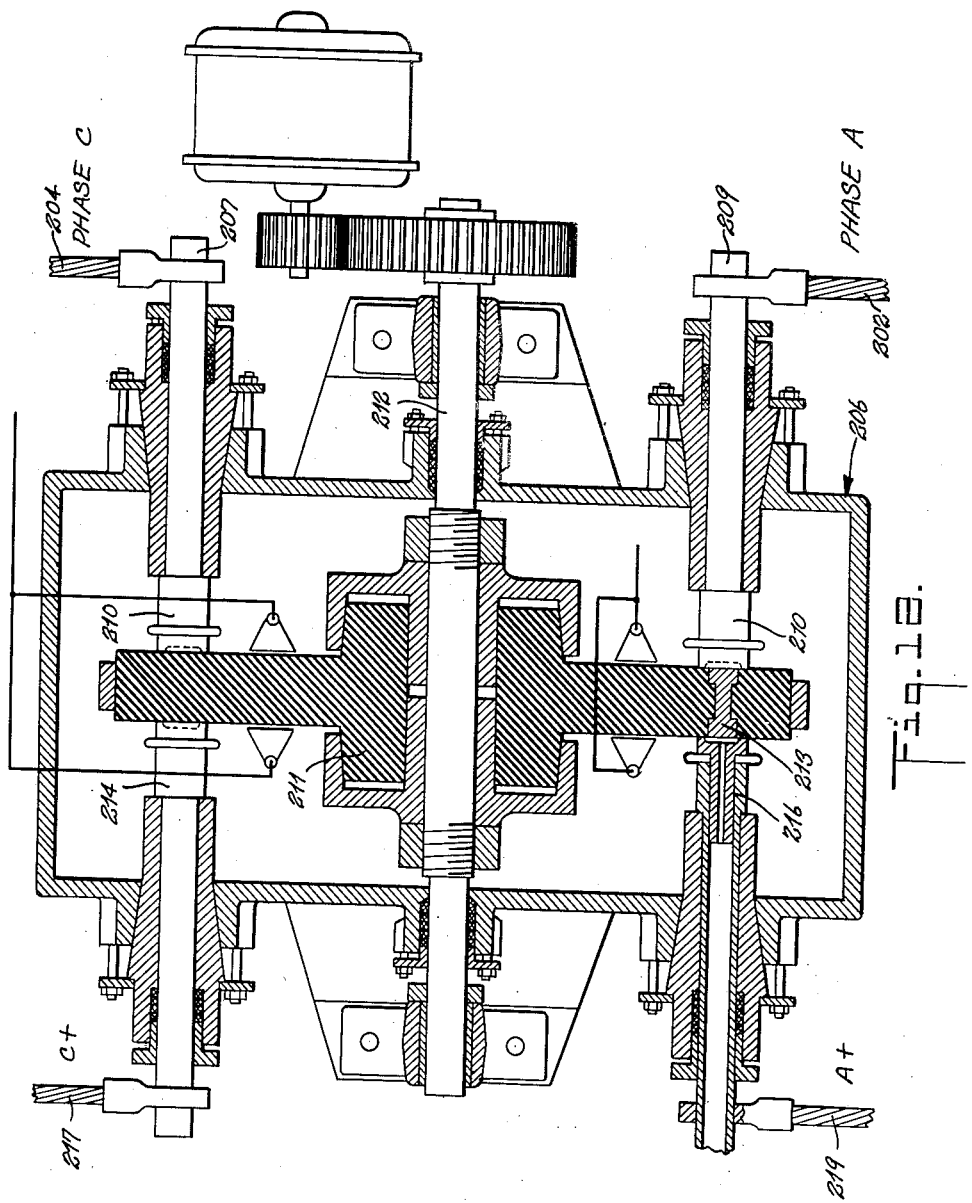
INVENTOR.
FRANK E. SMITH
BY
John L. Seymour
ATTORNEY

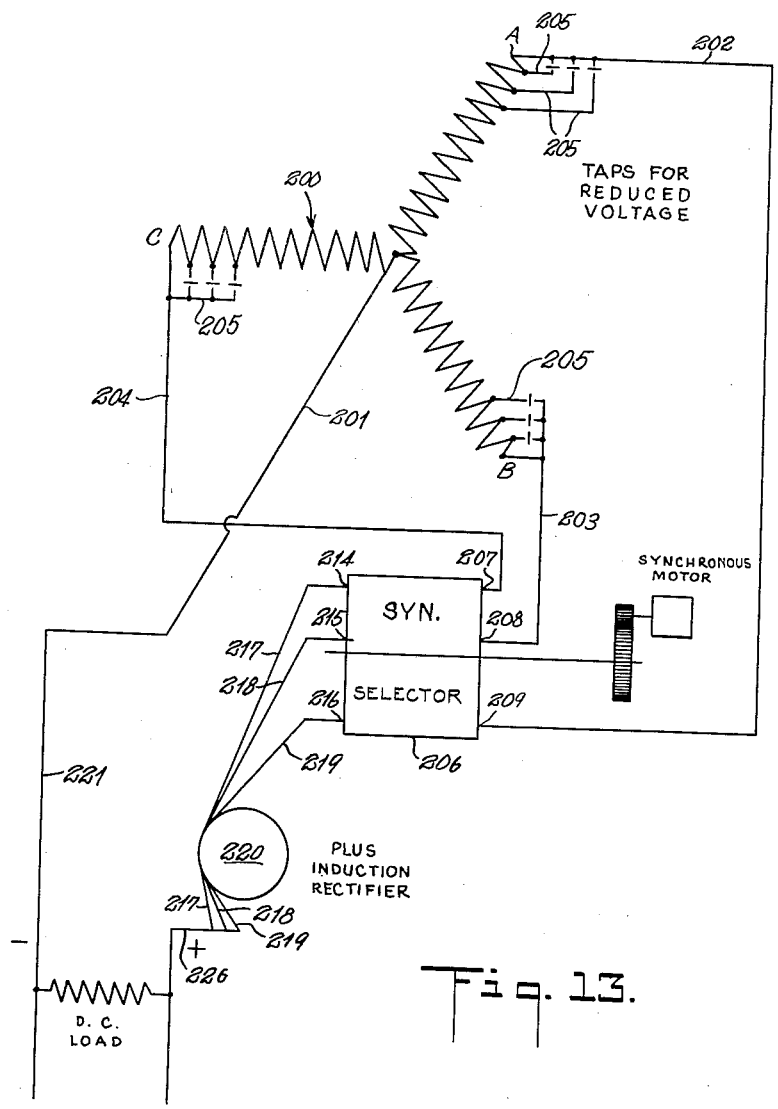

Patented Apr. 29, 1952

2,594,594

UNITED STATES PATENT OFFICE 2,594,594

ALTERNATING CURRENT RECTIFIER

Frank E. Smith, Niagara Falls, N. Y.

Application September 15, 1948, Serial No. 49,333

28 Claims. (Cl. 321—50)

This invention relates to a system for converting alternating current to direct current. It also relates to a synchronous selector for separating the alternating currents which proceed in one direction from those which proceed in the opposite direction, directing them into the load lines of a D. C. system. It also relates to induction rectifiers. It also relates to switches, particularly to rotary switches. It also relates to synchronous selectors employing sodium switches. It relates to a system of supplying molten sodium to electric systems employing it and includes circuit breaking sodium feeders. It includes an A. C.–D. C. system, a portion of which is sealed and operated in an atmosphere of nitrogen or of other inert gas. The invention also involves a number of dependent but important concepts which will be more fully set forth hereinafter.

Most current supply is of alternating current type. Nevertheless, there are large demands in industry for direct current. The most satisfactory manner of supplying this demand is to convert A. C. to D. C., and a number of converters working upon different principles have been constructed to accomplish the conversion. There are rotary A. C.–D. C. converters, vacuum tubes, mercury arc and copper oxide converters, as well as those of a mechanical switch type wherein an attempt is made by switches to direct the crests of the alternating current sine waves into one D. C. line and the nodes into another, the load being connected between the two lines. The use of mechanical switch apparatus to accomplish this result has been tried in monophase circuits but has been accompanied by such great difficulties that there has been no development along those lines in comparison to very great development in the other types.

Polyphase circuits and systems are most widely used for the distribution of electric power. It is helpful in thinking of polyphase circuits to keep in mind that any system having more than one circuit is a polyphase system, and that each phase may be considered as a separate current or circuit. Because of their method of generation, polyphase alternating currents can be represented on a graph by a number of sine waves corresponding to the number of phases, the several waves being separated and, in effect, following each other across the graph. The portion of each wave above the zero line of the graph is considered to be current proceeding in one direction and that portion of the wave below the zero line is considered to be current proceeding in the other direction. The object of converting systems is to rectify this current so that is proceeds only in one direction. Alternating current systems of two to twelve or more phases have been made and more or less successfully operated, and it is to be understood that the several principles of this invention are applicable to all such systems. However, the commonest of all systems being three phase A. C., this invention will be particularly described with respect to the converting of that type of current to D. C.

The several prior art types of converter have all been subject to severe handicaps and to material limitations in their efficiency and their capacity. For example, some of them produce a fluctuating D. C. current which is less than satisfactory for general use and which has a serious problem in making the D. C. current flow, because the A. C. potential is employed to make the D. C. current flow and the current in a succeeding phase will not flow until the E. M. F. in the preceding phase has fallen below its own E. M. F. This results in a vertual stoppage of current, as one phase relinquishes and the succeeding phase takes over. A particular difficulty with prior art rectifying systems lay in achieving full use of the potential of the polyphase A. C. circuit. In general, little use has been made of the negative potential of such circuits. Another difficulty with the prior art rectifier systems has been expressed as a poor power factor. Still another difficulty has arisen by reason of short circuits from the high to the low potential plus phases when the load on or resistance of the line varies so that the current may short between the high and low plus phases.

In the mechanical switch type of rectifier, of which there are very few, there has been great objection because of the tendency of the switch points to arc and burn out or at least to deposit upon the face of one, metal drawn from the body of the other and thus to make imperfect the closing of the points. Sometimes these points when subjected to an overload will burn out, requiring the rebuilding of the apparatus.

A particular need of any rectifying system is that it shall satisfy the requirements of full and varying degrees of load, with efficiency.

It is an object of this invention to make a rectifying system, operable at substantial unity power factor, which is an improvement over the prior art in at least one and preferably in many or all the respects hereinabove noted. In particular, it is an object of the invention to construct a rectifying system in which the flow of current in a succeeding phase will be initiated before the potential of that phase exceeds the potential of the preceding phase.

Another object of the invention is to employ the full positive and negative potential of a polyphase circuit, and especially to employ the full negative potential thereof.

Another object of the invention is to reduce or to eliminate the possibility of short circuits from one phase of high potential to an adjacent phase of like sign and of low potential.

Yet another object of the invention is to make a synchronous selector having superior switching gear in which the making and breaking of contacts is accomplished without destruction or wear of the contacts, and which are consequently capable of remaining in use for longer periods of time than has heretofore been possible.

Another object of the invention is to reduce the magnitude of the fluctuations in the E. M. F. of the D. C. system produced by conversion of A. C. current.

Yet another object is to satisfy the requirement that the system shall operate efficiently with full load, or part load. There are many other objects of the invention involved because not only the system itself but the separate parts thereof involve inventive concepts, and the nature of these other objects of the invention will be more fully comprehended as the description proceeds.

In the preferred form of the invention, the system includes a delta type transformer. In a modified form of the invention a Y type polyphase transformer is employed. The two systems have material differences, the latter requiring fewer parts but the delta type being of superior efficiency.

In the accompanying drawings,

Fig. 1 is a diagrammatic view of a delta-connected, three-phase A. C.-D. C. rectifying system including a synchronous selector and an induction rectifier in both the plus and minus D. C. lines.

Fig. 4 is a vertical section through an induction rectifier.

Fig. 5 is a section on the line 5—5 of Fig. 4.

Fig. 6 is an enlarged section through one turn of the winding of Fig. 4.

Fig. 9 is a section on line 9—9 of Fig. 3.

Fig. 10 is a diagram of the disks showing conductor placement for the correct relation of three-phase current.

Fig. 12 is a section through the modified form of synchronous selector employed in the form of the invention of Fig. 13.

Fig. 13 is a diagrammatic view of a modified form of the invention employing a Y type transformer.

Fig. 14 is an enlarged elevation of the winding of the rectifier.

Figure 1:
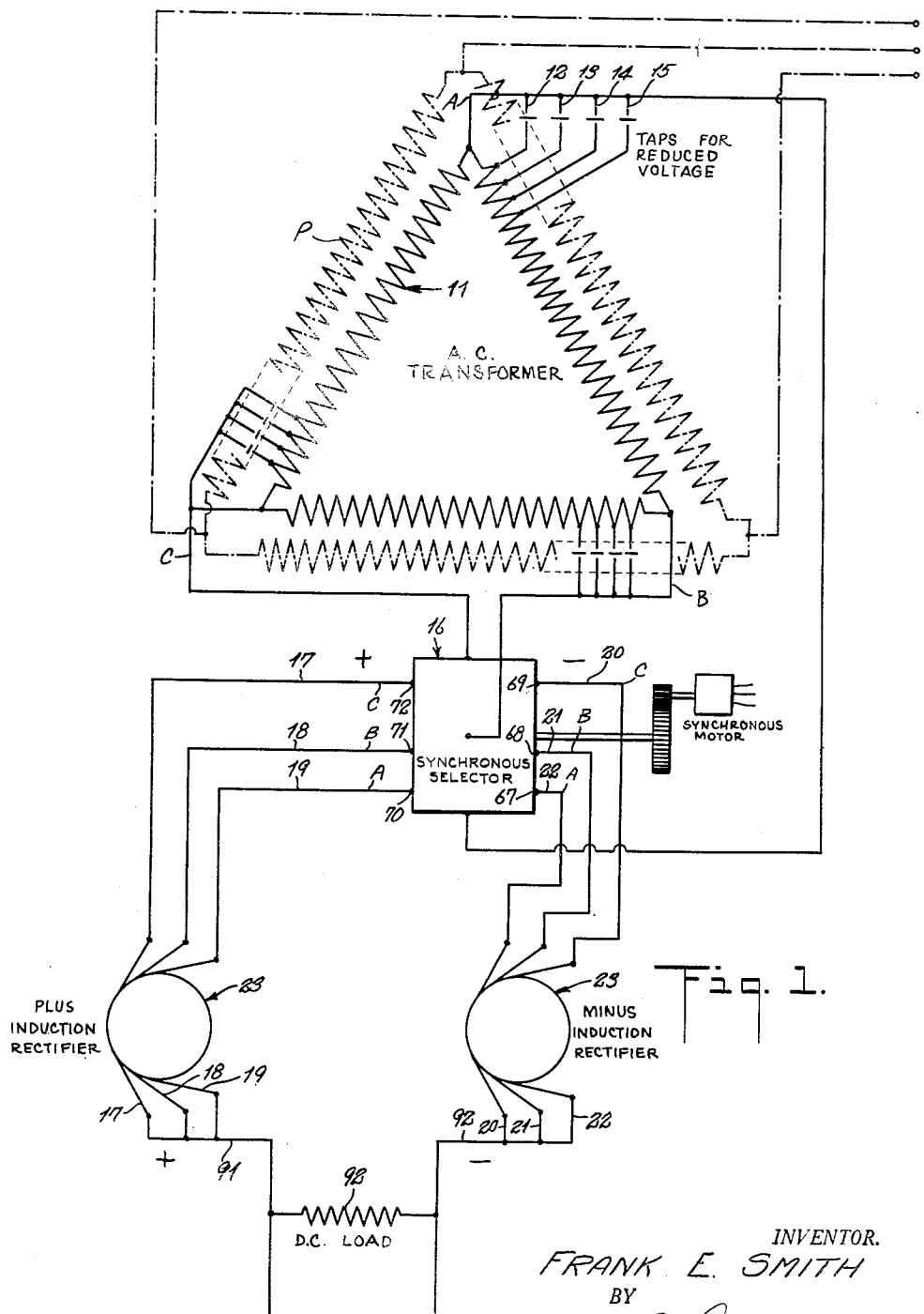

In Fig. 1 the numeral 11 indicates a three-phase A. C. transformer secondary which is supplied with current by a primary P, constructed in any usual manner. The letters A, B, and C indicate the three phases and the three phase lines that issue from the delta connected windings of the transformer secondary. Between these phase lines A, B and C and the respective windings of the transformer are taps such as 12, 13, 14 and 15 of the A phase, which may be selectively connected to reduce the voltage of the phases and to give the apparatus a flexibility it would not otherwise possess. The three phase lines are connected to different connections of a synchronous selector 16 within which the current is rectified and from which it issues on one side by lines 17, 18, 19 as plus D. C. and from the opposite side of which, by means of lines 20, 21, 22, it enters as rerectified A. C. Between the D. C. load and the synchronizing timer, on both the positive and negative sides of the load, are induction rectifiers 23, 23, the function of which in the system is important.

The function of the several parts of the invention will be better understood after a consideration has been had of their novel structure.

Figure 2:
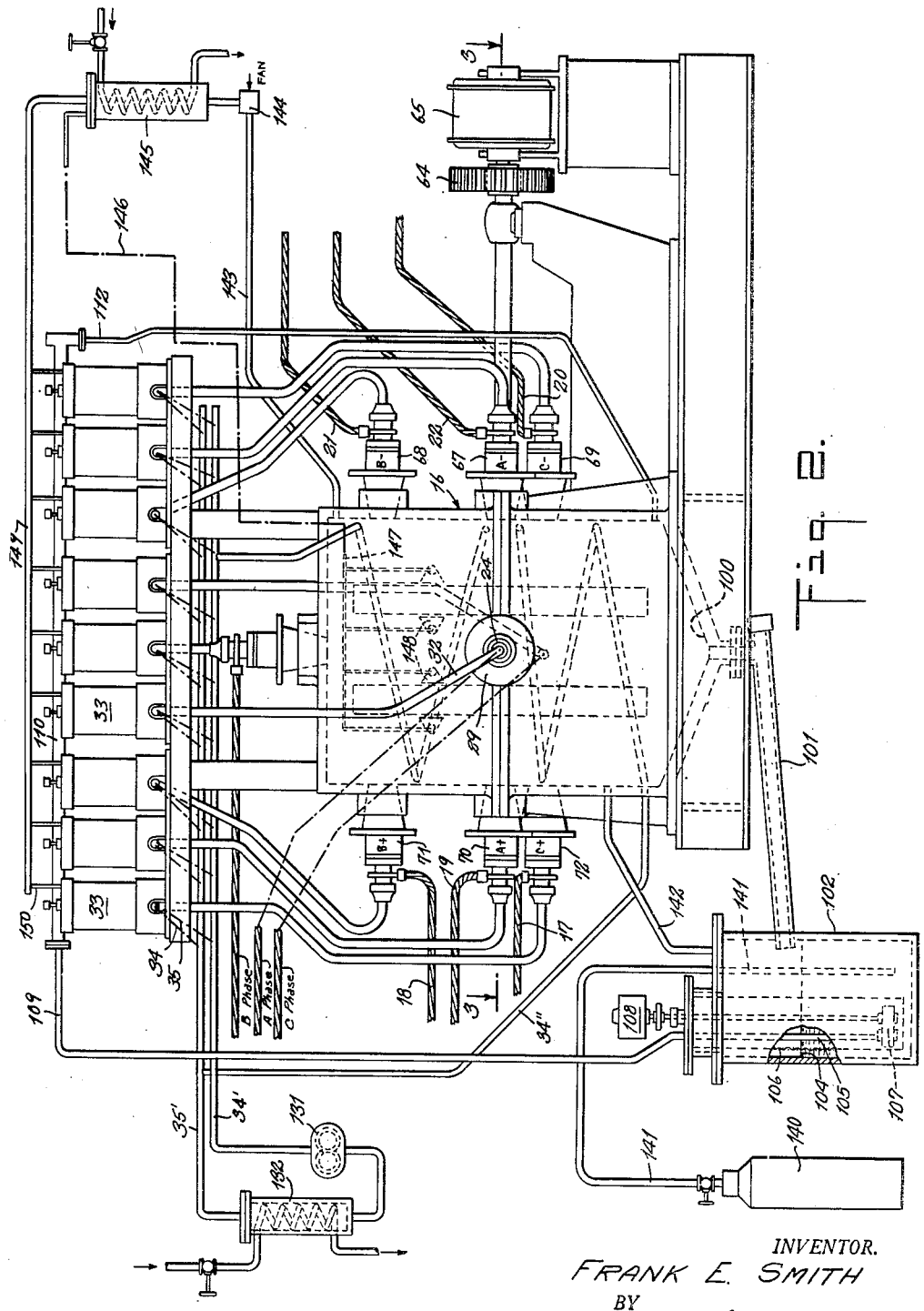
Fig. 2 is a side view largely in elevation, otherwise in section, of a synchronous selector.
Figure 3:
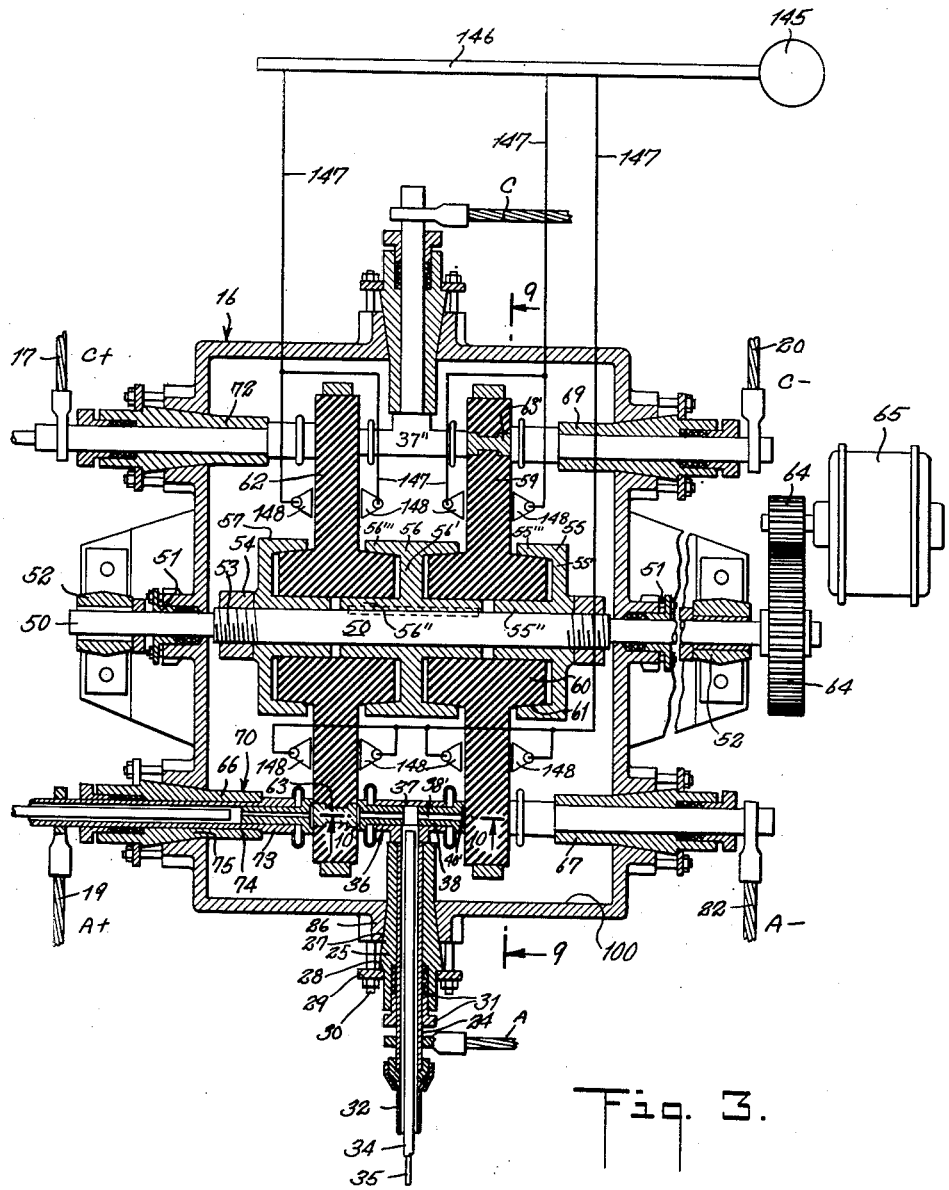
Fig. 3 is a section on the line 3—3 of Fig. 2.

Referring first to Figs. 2 and 3, A, B, and C indicate the phase lines diagrammatically shown in Fig. 1 as they are connected to the synchronous selector. These lines are electrically connected as shown in sectional detail in Fig. 3 to a metal tube 24 which is held in a flexible insulator 25 that is in turn sealed in a boss 26 provided with a conical seat 27 conforming to a like conical seat on the insulator. The insulator is provided with a ledge 28 upon which rests a washer 29 which is penetrated by bolts 30. Any degree of sealing pressure can be applied to the insulator 25 by means of washer 29. As a further protection against the entry or escape of gases to or from the sealed casing 16 of the synchronous selector, a packing gland 31 may be provided in the end of the insulator. The tube 24 is connected at its outer end to a tube 32 through which molten sodium is carried from a circuit breaker feeder 33.

Figure 11:
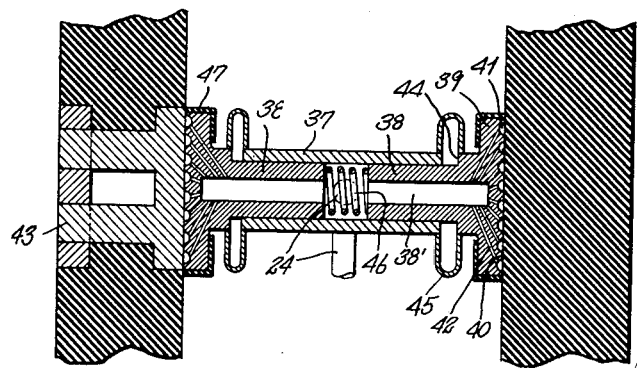
Fig. 11 is a section on line 10—10 of Fig. 3.

Molten sodium is a good conductor, but it must be maintained at temperature in order to remain molten. Consequently, the line 32 includes two other concentric lines 34, 35, of which tube 34 has a sealed end, and 35 an open end which terminates short of the end of tube 34. The hot oil is forced through the pipe 35 into the tube 34 and the casing 16 to a position adjacent to a major double contact or sodium switch point 36, the detailed construction of which is shown in Fig. 11, which should now be examined.

Carried by the tube 24 and the insulator through which it passes is a cross head tube 37 from which two slidable hollow sleeves 38 project. The bores 39' within these sleeves extend to a position adjacent the enlarged contact heads 39 which have flat faces 40 in which are formed annular grooves 41 which are connected by small passages 42 with the bore 39'. The face 40 of the contact member 38 is a contact face through which the current entering through the tube 24, and the molten sodium that it contains is transmitted to the metal contacts 43 in the rotors of the synchronous selector.

The molten sodium makes its way through the channels provided in the parts first described to the grooves in the faces of the contacts and forms a current-conducting film between the rotating face of the rotor and the fixed face of the contact 38. The contact 38 is provided with an annular shoulder 44 of thinness equal to that of sleeve 37 and a metal bellows 45 connects the two. This bellows is welded to both parts and forms both a seal and a kind of spring member which permits the movement of the contact. A spring 46 between the two contacts 38 urges them outward and into contact with the rotors. A facing of insulation 47 is provided for the contacts 38 and this serves to clean the approaching face of the rotor, to prevent excessive wear of the leading edge of the contact, and to prevent drawing out a spark. The contacts 38 may be of metal or they may equally well be made of ceramic or some non-conducting material inasmuch as sodium will itself transmit the current. However, metal is preferred.

In Fig. 3 the contacts are not provided with the several grooves of Fig. 10 but with a single cup 40' which receives the sodium from the bore 38' of the contact.

There are many advantages inherent in the novel construction which has just been described. The molten sodium forms a film between rotor and fixed contact and reduces wear. If an arc is drawn out between a rotating and a fixed contact, the sodium film between the faces will vaporize and protect the contacts and the apparatus against damage. In rotary switches having solid metal to solid metal contact, the flow of current causes pockets to form in one member and accumulations of metal to be acquired by the corresponding contact, necessitating repairs and replacement of parts, and shortening the use of the machine. By virtue of the new conceptions involving conducting liquid film contacts the life of the contacts is greatly increased, and the period of use of the machine without halt for repairs is greatly extended.

A shaft 50 is rotatably mounted in bearings 52 and passes through packing glands 51 into the casing. It is screw threaded at 53, 53 for the reception of nuts 54 which serve to position annular grips 55, 56, 57. Grip 56 has an annular web 56' projecting centrally from a sleeve 56'' and carries an internally bevelled double flange 56'''. The grip 55 has an annular web 55' projecting from a sleeve 55'' and carries a single inwardly bevelled flange 55'''. Grip 57 is like grip 55. The sleeves of the grips are received over, and sleeve 56'' is keyed to the shaft 50, so that they rotate with the shaft in assembled position. The grip 55 and grip 56 hold between them a rotor 59 which has a hub 60 with outwardly bevelled faces 61 corresponding to the bevels of the grips. The construction of rotor 62 is like that of rotor 59 and is similarly mounted between grips 56 and 57. By adjusting the nuts 54 the position of the rotors may be precisely adjusted along the shaft 50. A plurality of copper conductors 63 extend through the rotors from side to side. In the form of the invention being described there are five of these conductors shown in Fig. 9, equally spaced on each rotor and contained within arcs of 18 degrees. The rotors are so positioned on the shaft that the plus and minus discs connect their respective phases alternately.

The contacts A+, A— are aligned with A; contacts B+, B— with B; and C+, C— with C. The + conductors are numbered 63 and the — 63'.

The rotors 59 and 62 are identical except in the angular position of their contacts with respect to each other. They are conveniently made of glass or ceramic material, for instance, porcelain. They are preferably ground and polished after being positioned on the shaft so that the lateral faces will rotate in a true plane and furnish a minimum of frictional resistance to the fixed contacts.

The shaft 50 is driven through a 5 to 1 reduction gearing 64 which is in turn driven by a synchronous motor 65 which takes its power from the secondary that supplies the system. It must be understood that this description applies to the form of the invention which is being particularly described but that different gear ratios could be employed with other polyphase systems and other numbers of contacts on the discs.

As the motor is driven, current is fed through phase lines A, B and C to the three double contacts 37 between the discs. In the position shown in Fig. 3 the conductor 63 is connecting the contact 37 with another contact 66 which enters through the side wall. At that moment the A phase is delivering positive current to the line, and that current is transmitted through sodium contact 37, conductor 63, and contact 66, the molten sodium furnishing a perfect make and break at each place. As the positive potential in phase A approaches zero, the contact 63 moves away from contacts 37 and 66 while a contact in disc 59 approaches contacts 37 and 67. As the current reverses in phase A, becoming negative, contact is broken by contact 63 of the disc 62 and contact is made between 37 and 67 by a copper contact disc 59 so that phase A is connected through contact 67 and not through contact 66. Inasmuch as a synchronous motor is employed to drive the discs, this make and break can be accomplished with precision. The stators of the synchronous motor can be rotated a little in advance or in retard to achieve with precision any timing desired.

The conductor and contacts should be within ¼ cycle to remove the danger of the center contact shorting 63 and 63'. The discs may be rotated at 720 R. P. M. for sixty cycle three phase current and at 300 R. P. M. for twenty-five cycle three phase current. One complete cycle occurs in 72 degrees. The contact brushes of each sign (+ or —) will accordingly be located at 96 degrees from each other, since B phase is ⅓ cycle advanced over A, as C is over B.

From each side of the casing 16 there issue three contacts, the three negative contacts being given the numbers 67, 68, 69 and the three plus contacts, the numbers 70, 71, 72. The construction of these contacts with their brushes is similar to the construction of 25, differing in that there is no T-shaped member 36, the brush 73 extending directly outward from the tube 74 which is set in the insulator 75. The contacts 67, 68 and 69 are connected to negative D. C. current lines 22, 21 and 20 while contacts 70, 71, and 72 are connected to positive D. C. phase lines 19, 18, 17. Each of the phases delivers its positive current in sequence to its own phase line, and the phase lines 20, 21, 22 receive the negative D. C. current in sequence.

At this point it is noted that the lines 17, 18, 19 could be directly attached to a bus bar, and the lines 20, 21, 22 could be directly attached to another bus bar, the two bus bars serving to supply D. C. current to a load. So far as is known that has been the proposal of prior attempts to rectify current by mechanical switching. However, such systems are faulty in their operation under different conditions. For instance, if the circuit is suddenly opened so that there is no load while phase A has high positive potential and phase B very low positive potential, a short may occur from phase A to phase B to the internal destruction of the wiring of the system. Other difficulties arise in such systems because of the relatively pulsating nature of the current delivered, there being a very considerable difference between the E. M. F. at the crest of one phase wave and the E. M. F. of that phase at the moment when the succeeding phase takes over. Consequently, I have incorporated in my system novel conceptions calculated to produce a more even flow of D. C. current, to reduce or totally eliminate the possibility of short circuits through the several + and − phases, and to deliver power with a minimum of loss. Consequently, in combination with the synchronous selector, there is included in my preferred system a new apparatus, called an induction rectifier. The induction rectifiers are themselves novel. A single rectifier on the plus side may be used in one form but the preferred form of the invention includes a rectifier on the negative side also. An induction rectifier as employed in this specification and the claims is a circuit employing the magnetic field created by the current flowing in one phase to resist counter-flow of current in other phases wound with it. When so functioning it permits flow in one direction only.

Referring now to Figs. 4, 14, 5 and 6, the numerals 19, 18, 17 are the +A phase, B phase and C phase lines respectively of the rectified current. These wires are enclosed in insulation 80, so they are protected against short circuiting to each other. These wires are laid in parallel and are wound within a flat steel wire 81 which is laid in one direction and again in a flat steel wire 82 which is laid in the other direction. These three phase wires are thus encabled in a metallic casing of good flux conducting properties, the wire constitution being particularly chosen with that property in mind. The cable, which is given the generic number 83, is wound about a core 84 which may be a permanent magnet, or simply of soft iron or of magnetic steel. The core 84 should have good flux conducting properties. Its characteristics can be changed by selection of materials for particular rates of discharge. It is joined at its ends by yokes 86, 86' to posts 87, 88.

Wedges 89 support the windings of the core 83 within the posts 87, 88, which are, in section, more or less triangular with curved sides.

The current that flows through the lines 17, 18 and 19 is direct current. Consequently, as each of these lines receives the discharge of its connected phase, a circular flux about the line is established, varying in intensity. The steel windings 81, 82 invite that flux not only to travel in its own direction but to include in its circuit all three phase lines. Consequently the flux about the cable is the sum of the fluxes existing about the individual wires and lacks the variation in intensity which is characteristic of the flux about a single wire. The coil 83 consequently acts as a single winding and energizes the core 84, establishing a flow of flux, such as indicated by the arrows, which is continuous and offers substantially no resistance and occasions substantially no loss. In all standard systems, due to their voltage differentials, only one phase carries the + current and one the negative current. This means that one phase must carry the full maximum current, and that there is a shock when one phase comes on and the other lets go. That influences power factor as it throws current and potential out of step and contributes to harmonics which are disturbing to telephone and radio transmission. In particular, if there is a low power factor in the supply current, the current flow becomes upset, cutting off one phase at a very high E. M. F. and cutting in another at a low value. It even means at times that there is no current flowing. In this invention, on the other hand, the stored energy in the core of the induction rectifier supplied by one phase is transferred to the succeeding phase so that current starts to flow in it before it stops flowing in the first phase. Furthermore, the induction stores energy in the core which resists any counterflow in the coil.

The induction rectifier is air-cooled in small units and can be oil-cooled within a casing in large units. The steel employed in the rectifier may desirably lie between the best silicon transformer steel and permanent magnetic steel. The choice will vary with load conditions. The unit permits a low resistance flow in one direction and imposes high resistance in the opposite direction. There are two windings so closely associated that mutual inductance prevents short circuits. There is helpful mutual inductance between the current carrying lines within the coil.

The three windings 17, 18, 19 are connected to a + bus bar 91 from which the load 92 draws its + current, and the load is connected through bus bar 92 to negative lines 20, 21, 22 in which is another induction rectifier. The use of two induction rectifiers, one in the + and one in the negative line, is a necessary feature of the invention employing a delta connection and the full and maximum E. M. F. of the A. C. supply.

In order to maintain the system employing sodium at its highest efficiency, the portions where sodium appears are preferably sealed in an atmosphere of inert gas of which nitrogen is exemplary. Before being admitted to the system the nitrogen is cleaned of all traces of gases capable of reacting with the sodium. The molten sodium being a conductor and being fed in slowly moving streams to the various brushes, would carry the current to undesirable places were it not for the employment of circuit breaking feeders of novel construction. The method of maintaining the sodium in a molten condition is also novel. In order to maintain all parts of the apparatus in satisfactory running condition, which is neither hot enough to cause excessive wear in or damage to the system, nor so cold that it congeals the sodium, a heating system is provided which employs hot oil for relatively fixed parts and streams of heated nitrogen wherever needed for moving parts. These several portions of the invention will now be described.

Figure 7:
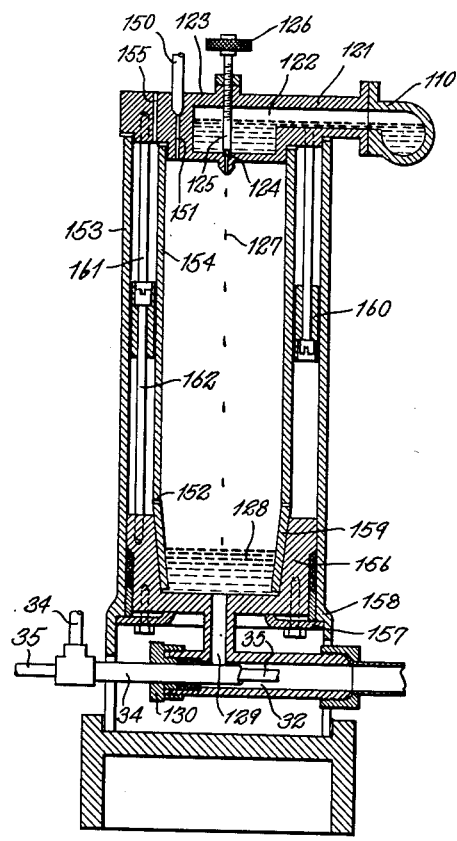
Fig. 7 is a vertical sectional view of the circuit breaking sodium feeder, taken on line 7—7 of Fig. 8.
Figure 8:
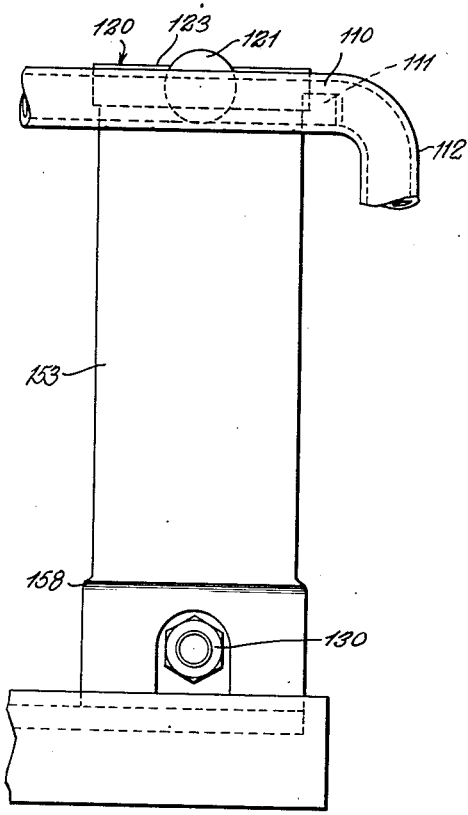
Fig. 8 is an elevational view of the said feeder.

Referring again to Fig. 2 and Fig. 3, it is to be considered that the casing 16 has a sump 100 which gathers the molten sodium which escapes from the brushes and returns it through a pipe line 101 to a well 102 which involves a container 103 in which molten sodium is maintained at a level 104. A tube 105 extends downward beneath the level of the sodium and a screen 106 is attached thereto and filters the sodium which is drawn from the well by a pump 107 driven by motor 108. The sodium is forced by the pump through pipe line 109 to a manifold 110 which extends above the circuit breaking sodium feeders. This manifold has a weir 111 which maintains the sodium in the manifold at a level, the excess sodium being returned through pipe 112 to the sump in casing 16. The manifold 110 extends alongside the several feeders one and a portion of another of which are shown in Fig. 7 at 120, and are connected thereto by channels 121. The level of the sodium in the manifold 110 is above the bottom of the channel 121 so that the sodium flows inward from the manifold to a cup 122 in the head 123 of the feeder. In the bottom of this cup is a needle valve seat 124 with which a needle valve stem 125 cooperates, being adjustable by means of a set screw 126 operable from outside the feeder. This permits the sodium to fall in drops 127 down to the bottom of the feeder where it gathers in a pool 128 and passes through a passageway 129 into the sodium supply pipe 32 which is connected at its other end to one of the brushes, for instance, to 24 as shown in Fig. 2. The supply pipe 32 is sealed at its end by packing gland 130 through which pass the oil supply pipes 34, 35. These concentric hot oil feed pipes extend to the positions shown in Fig. 3 so that the sodium is maintained at proper temperature throughout the length of the pipes. It is to be understood that in all cases where heat is applied insulation may be employed, but the showing of such insulation is omitted in order to maintain the drawings in as simple a condition as is consistent with an adequate disclosure. The oil is circulated through dielectric delivery pipes indicated in Fig. 2 at 34' and 35', in which system there is a pump 131 which maintains sufficient circulation in the oil, and a steam oil heater 132 in the same circuit maintains the oil at temperature. Circuit breaking feeders deliver sodium to each of the — D. C. brushes, circuit breaking feeders deliver sodium to each of the + D. C. brushes, and circuit breaker feeders serve each of the A. C. brushes of the synchronous selector. Hot oil pipe 34'' heats the casing.

The circuit breakers may be of single wall construction but in cases of large electrical capacity are preferably of double wall construction, each wall 153, 154 being a glass or other dielectric cylinder clamped between the head 123 and a dielectric base member 156. Clamps 157 bear against an offset annulus 158 and against the bottom of the base member 156 in which the sodium orifice 129 is found. The inner cylindrical face of the member 156 is tapered at 159, forming a tapered fit with the tapered bottom of the tube 154. The head 123 is attached to an insulating ring 160 by offset rods 161, 162, the spacing of such rods being such that adequate insulating distance is maintained between them. The ring has nuts molded in it, in which screw threaded rods are received to hold the parts together.

In order to exclude oxygen from the system, it it maintained in an atmosphere of nitrogen under super atmospheric pressure. The nitrogen is drawn from supply 140 through a tube 141 which extends downward beneath the level of the sodium in the well 102, bubbling up through the sodium, in which all traces of undesired gas are removed, and passes out from above the surface of the sodium through a pipe 142 to the casing 16, from whence it passes by a pipe line 143 to a blower 144 and a steam heater 145 by which it is raised to a temperature sufficient to keep sodium molten. From the heater it passes by pipe line 146 to a plurality of lines 147 to nozzles 148 which are directed to the faces of the discs 59, 62 and maintain them at a temperature which prevents the congealing of the sodium. A nitrogen line 149 extends from the nitrogen heater or one of its lines to a position above the sodium feeders and is connected thereto by pipes 150 as shown in Fig. 2 and Fig. 7. A small hole 151 in the feeder admits nitrogen from tube 150 to the interior of the breaker from whence it is enabled to escape in a minor amount through small orifices 152. From the orifices 152 the nitrogen is exhausted from between the two glasses 153, 154 forming the wall of the feeder and out through the opening 155. The size of the orifices 152 and 155 may be small enough to make the loss of nitrogen negligible and the construction of return lines unnecessary.

There is discussed hereinafter a modification of the invention in which it is employed with a Y-type transformer. This is illustrated in Figs. 13 and 12. Although this modification appears to be simpler, it is not preferred. Referring now to Figs. 13 and 12, the numeral 200 indicates a Y-type transformer secondary having a neutral wire 201 and A, B, C leads 202, 203, and 204, respectively, taps 205 being provided to alter the voltage of each phase. The phase leads are admitted to synchronous selector 206 on one side by sodium carrying tubes 207, 208, 209 which are constructed and have sodium brushes 210 similar to those which have hereinbefore been described. A single rotary disc 211 is mounted on the synchronously driven shaft 212, which is provided with transverse conductors 213. Opposite brushes 214, 215, 216 are provided to deliver current through leads 217, 218, 219 to an induction rectifier 220. From the induction rectifier the leads pass to a plus bar 226 and to a D. C. load, the return line 221 being connected to the neutral wire 201 of the transformer secondary.

This modification shows the adaptability of the invention to other systems than that of the preferred form, but it is noted that to attain an evenness of D. C. current comparable to that of the preferred form, the modification ought to have many more phases, for instance, twelve. Consequently, although this modification of the invention is simplier in theory it is inferior in some uses, particularly in those uses where D. C. current with small variation in E. M. F. is desired.

An advantage of this invention is in the construction of an A. C.-D. C. rectifier or converter system which is superior to the known systems including the copper oxide rectifiers, the mercury arc rectifiers, and to monophase mechanical switching arrangements of the sort heretofore attempted.

The combination with a polyphase system of synchronous selector and induction rectifiers marks a material advance in the construction of conversion systems. The synchronous selector as described with its sodium contacts is adapted to precise construction and to long, continuous operation without halt for repairs. Almost the entire construction of this synchronous selector is new, including the switches per se and the brushes. The method of employing sodium as a conductor is novel and has material electrical and mechanical advantages. The protection of the sodium from reactive gases is simple and satisfactory, and the means of delivering it to the point of use, convenient.

The induction rectifier protects the system against shorts and malfunctioning of the circuits and improves the efficiency of rectification. The construction of the apparatus is simple in comparison with the results accomplished.

One of the notable electrical advances of the present invention is that two phases of the A. C. may deliver power simultaneously to the D. C. lines whereas in previous systems the delivery of one terminated as the delivery of the next began. This overlap constitutes a material advance in the art.

In certain places the term polyphase D. C. is used, and although it is unusual, signifies a direct current substantially uniform in flow and E. M. F. supplied by a polyphase A. C. system in which the full E. M. F. of the A. C. system is directed to produce the E. M. F. of the D. C. load line. Where D. C. phase wires is referred to, it signifies a system in which separate wires carry the separate, rectified output of the phases of a polyphase A. C. system.

As many apparently widely different embodiments of this invention may be made without departing from the spirit and scope thereof, it is to be understood that I do not limit myself to the specific embodiment thereof.

What is claimed is:

1. An electrical conversion apparatus including a source of polyphase A. C. current, a synchronous selector supplied with polyphase alternating current by said source, a load line supplied with direct current by said synchronous selector, and an induction rectifier in said load line between the load and the synchronous selector.

2. An electrical conversion apparatus including a polyphase transformer, a synchronous selector supplied with polyphase alternating current by said transformer, a load line supplied with polyphase direct current by said synchronous selector, and induction rectifiers in said load line between the load and the synchronous selector, said synchronous selector including a casing, a shaft extending into said casing, a pair of dielectric rotors on said shaft, each rotor having five transverse conductors offset from those of the other rotor, A. C. contacts between said rotors aligned with the paths of said transverse conductors and connected to the phases of said transformer, conduits extending to the contact faces of said contacts, means to deliver molten sodium through said conduits to said contact faces, D. C. contacts aligned with the A. C. contacts and with the paths of said transverse conductors on the outsides of said rotors, conduits extending to the contact faces of said D. C. contacts, means to deliver molten sodium through said conduits to said D. C. contact faces, circuit breakers in each sodium line, and means to drive said rotors at one fifth full A. C. generator speed comprising a synchronous motor and reduction gearing.

3. An electrical conversion apparatus including a polyphase transformer, a synchronous selector supplied with polyphase alternating current by said transformer, a load line supplied with polyphase direct current by said synchronous selector, and induction rectifiers in said load line between the load and the synchronous selector, said synchronous selector including a casing, a shaft extending into said casing, a pair of dielectric rotors on said shaft, each rotor having five transverse conductors offset from those of the other rotor, A. C. contacts between said rotors aligned with the paths of said transverse conductors and connected to the phases of said transformer, conduits extending to the contact faces of said contacts, means to deliver a liquid conductor through said conduits to said contact faces, D. C. contacts aligned with the A. C. contacts and with the paths of the said transverse conductors on the outside of said rotors, conduits extending to the contact faces of said D. C. contacts, means to deliver a liquid conductor through said conduits to said D. C. contact faces, and means to drive said rotors at one fifth full A. C. generator speed comprising a synchronous motor and reduction gearing.

4. An electrical conversion apparatus including a polyphase transformer, a synchronous selector supplied with polyphase alternating current by said transformer, a load line supplied with polyphase direct current by said synchronous selector, and induction rectifiers in said load line between the load and the synchronous selector, said synchronous selector including a casing, a shaft in said casing, a pair of dielectric rotors on said shaft, each rotor having five transverse conductors offset from those of the other rotor, A. C. contacts between said rotors aligned with the paths of said transverse conductors and connected with the phases of said transformer, conduits extending to the contact faces of said A. C. contacts, D. C. contacts on the outsides of said rotors aligned with the A. C. contacts and with the paths of said transverse conductors, conduits extending to the contact faces of said D. C. contacts, means to deliver a liquid conductor through said conduits to said contact faces, and means to drive said rotors at one fifth full A. C. generator speed.

5. An electric conversion apparatus including a polyphase transformer, a synchronous selector supplied with polyphase alternating current by said transformer, a load line supplied with polyphase D. C. by said synchronous selector, and induction rectifiers in said load line between the load and the synchronous selector, said synchronous selector including a casing, a shaft in said casing, a pair of dielectric rotors on said shaft, each rotor having transverse conductors offset from those of the other rotor, A. C. contacts between said rotors aligned with the paths of said transverse conductors and connected to the phases of the said transformer, conduits extending to the contact faces of said A. C. contacts, D. C. contacts on the outsides of said rotors aligned with the said A. C. contacts and with the paths of said transverse conductors, conduits extending to the contact faces of said D. C. contacts, means to deliver a liquid conductor through said conduits to said contact faces, and means to drive said rotor contacts in synchronism with the phase changes in the transformer.

6. An electrical conversion apparatus including a polyphase transformer, a synchronous selector supplied with polyphase alternating current by said transformer, a load line supplied with polyphase D. C. by said synchronous selector, and induction rectifiers in said load line between the load and the synchronous selector, said synchronous selector including a casing, a shaft in said casing, dielectric rotors on said shaft, each rotor having transverse conductors offset from those of the other rotors, A. C. contacts on the paths of the transverse conductors on one side of each rotor and connected to the phases of said transformer, conduits extending to the contact faces of said A. C. contacts, D. C. contacts aligned with the A. C. contacts on the other side of said rotors, conduits extending to the contact faces of said D. C. contacts, means to deliver a liquid conductor through said conduits to said contact faces, and means to drive said rotor contacts in synchronism with the phase changes in the transformer.

7. An electrical conversion apparatus including a polyphase transformer, a synchronous selector supplied with polyphase alternating current by said transformer, a load line supplied with polyphase direct current by said synchronous selector, and induction rectifiers in said load line between the load and the synchronous selector, said synchronous selector including a casing, a shaft in said casing, rotors on said shaft having alternating transverse conductors, A. C. contacts on the paths of the transverse conductors on one side of each rotor and connected to the phases of said transformer, conduits extending to the contact faces of said A. C. contacts, D. C. contacts aligned with the A. C. contacts on the other sides of said rotors, conduits extending to the contact faces of said D. C. contacts, means to deliver a liquid conductor through said conduits to said contact faces, and means to drive said rotor contacts in synchronism with the phase changes in the transformer.

8. An electrical conversion apparatus including a polyphase transformer, a synchronous selector supplied with polyphase alternating current by said transformer, a load line supplied with polyphase direct current by said synchronous selector, and induction rectifiers in said load line between the load and the synchronous selector, said synchronous selector including separate contacts connected to the several phases of the transformer, a pair of space conductors aligned with each of said contacts, rotary conductor means constructed and arranged to make contact alternately between each said separate contact and the contacts of its associated pair, means to maintain a film of liquid sodium between said rotary conductor means and separate contacts, and means to engage the rotary contact means with its associated pair of contacts alternately in synchronism with the change in direction of current flow.

9. An electrical conversion apparatus including a polyphase transformer, a synchronous selector supplied with polyphase alternating current by said transformer, a load line supplied with polyphase D. C. current by said synchronous selector, and induction rectifiers in said load line between the load and the synchronous selector, said synchronous selector including separate contacts connected to the several phases of the transformer, a pair of spaced contacts aligned with each of said contacts, rotary conductor means making contact alternately between each of said separate contacts and the the contacts of its associated pair, means to maintain a film of liquid conductor between said rotary conductor means and separate contacts, and means to engage the rotary conductor means with its associated pair of contacts alternately in synchronism with the change in current direction in the transformer.

10. An electrical conversion apparatus including a source of polyphase A. C. current, a synchronous selector supplied with polyphase A. C. by said source, a plurality of lines supplied with D. C. from the A. C. phases of said source by said synchronous selector, and an induction rectifier in said plurality of lines.

11. An electrical conversion apparatus including a source of polyphase A. C. current, a synchronous selector supplied with polyphase alternating current by said source, a load line supplied with polyphase direct current by said synchronous selector, and induction rectifiers in said load line between the load and the synchronous selector, including a figure-eight core of transformer core metal the center bar of which carries a winding composed of the insulated D. C. phase wires laid in parallel and enclosed in a flexible metal case of high permeance within an oil cooled metal housing.

12. An electrical conversion apparatus including a source of polyphase A. C. current, a synchronous selector supplied with polyphase alternating current by said source, a load line supplied with polyphase direct current by said synchronous selector, and induction rectifiers in said load line between the load and the synchronous selector, including a figure-eight core of transformer core metal the center bar of which carries a winding composed of the insulated D. C. phase wires laid in parallel and enclosed in a flexible metal case of high permeance.

13. An electrical conversion apparatus including a source of polyphase A. C. current, a synchronous selector supplied with polyphase alternating current by said source, a load line supplied with polyphase D. C. current by said synchronous selector, and induction rectifiers in said load line between the load and the synchronous selector, including a looped core of high permeance metal, one part of which carries a winding composed of the insulated D. C. phase wires laid in parallel and enclosed in a flexible metal case of high permeance.

14. An electrical conversion apparatus including a source of polyphase A. C. current, a synchronous selector supplied with polyphase alternating current by said source, a load line supplied with polyphase D. C. current by said synchronous selector, and induction rectifiers in said load line between the load and the synchronous selector, including a looped core of high permeance, one part of which carries a winding composed of a plurality of D. C. phase wires enclosed in a flexible metal case of high permeance.

15. An electrical conversion apparatus including a source of polyphase A. C. current, a synchronous selector supplied with polyphase alternating current by said source, a load line supplied with polyphase D. C. current by said synchronous selector, and induction rectifiers in said load line between the load and the synchronous selector, including a winding composed of a plurality of D. C. phase wires enclosed in a flexible metal case of high permeance and a closed flux conductor in magnetic association with said winding.

16. An electrical conversion apparatus including a source of polyphase A. C. current, a synchronous selector supplied with polyphase alternating current by said source, a load line supplied with polyphase D. C. current by said synchronous selector, and induction rectifiers in said load line between the load and the synchronous selector, including a winding composed of a plurality of insulated D. C. phase wires wound in parallel about a portion of a flux conducting loop.

17. An induction rectifier for three phase D. C. current including a core of high permeance having a winding composed of three parallel, insulated conductors for the phases, said insulated conductors being cabled in a plurality of oppositely laid windings of flat metal strips of high permeance and wound about the core, and a plurality of closed metallic flux paths of high permeance looped about said winding.

18. An induction rectifier including a core of high permeance having a winding composed of parallel insulated conductors for the phases, said insulated conductors being cabled in a plurality of oppositely laid windings of flat metal strips of high permeance and wound about the core, and a plurality of closed metallic magnetic flux paths of high permeance looped about said winding.

19. An induction rectifier including a core of high permeance having a winding composed of a plurality of separate conductors for the phases, said conductors being cabled in a flexible casing of high permeance, said cable being wound about the core, and a metallic flux path of high permeance connecting the ends of the core.

20. An induction rectifier including a winding composed of separate conductors for the phases enclosed in a flexible casing of high permeance, and flux conducting means connecting the ends of the winding.

21. An induction rectifier including a winding composed of a plurality of insulated conductors for the separate phases wound in a tight coil about a portion of a magnetic flux conducting metallic loop.

22. A synchronous selector including contacts corresponding in number to the number of phases of a polyphase system, a pair of spaced contacts aligned with each of said contacts, rotary connector means making contact alternately between each of said phase contacts and the contacts of its associated pair, means to maintain a film of liquid conductor between said contacts, and means to engage each rotary contact with its associated pair of contacts alternately.

23. A synchronous selector including three aligned, spaced contacts, rotary conductors between said contacts, said rotary conductors being angularly spaced whereby to connect the central of the three contacts alternately with the other contacts, and means to maintain a film of liquid sodium between said contacts and conductors at engagement.

24. A synchronous selector including three aligned, spaced contacts, rotary conductors between said contacts, said rotary conductors being angularly spaced whereby to connect the central of the three contacts alternately with the other contacts, and conduit means to supply the face of one of said contacts with a liquid conductor.

25. In electrical apparatus a plurality of polyphase current lines, a synchronous selector transmitting D. C. from said lines to an equal number of D. C. lines, an induction rectifying means including a loop core for the passage of flux having a part within a coil formed of the D. C. lines, and a single D. C. line connected to said D. C. lines beyond the coil.

26. In electrical apparatus a plurality of lines carrying polyphase current, a synchronous selector transmitting D. C. from said lines to an equal number of D. C. lines, and an induction rectifying means in the D. C. lines having low resistance in the direction of flow and high resistance to counterflow.

27. A synchronous selector employed in the conversion of polyphase alternating current supply to a direct current use consisting of means to direct the plus current to a plus induction rectifier and receive the minus current from a minus induction rectifier, said means consisting of two rotating dielectric discs containing conductors for closing the circuit between contacts on opposite sides of said discs, one of said contacts being connected to one phase of the A. C. supply and the other contact being connected to the plus leads of the D. C. circuit for one disc and the negative leads of the D. C. circuit for the other disc, said contacts to be supplied with a liquid metallic conductive medium for closing the space between said contacts and said conductors, the number of said conductors being at least one more than the number of phases in the supply and so spaced and operating at such a speed that the conductors make and break contact with the contactors when the current is at or near zero, the two discs being in spaced relationship to each other.

28. An induction rectifier employed in the conversion of polyphase alternating current supply to a direct current use consisting of means energized by the maximum current flow and maximum E. M. F. which allows flow in one direction with a small resistance and opposite flow with a high resistance, said means consisting of an iron core of high permeability wound with three parallel windings of insulated conductors, said conductors being connected on one side to the individual outlet conductors of a synchronous selector and on the other side to the bus of a D. C. circuit.

FRANK E. SMITH.

REFERENCES CITED

The following references are of record in the file of this patent:

UNITED STATES PATENTS

| Number | Name | Date |
|---|---|---|
| 728,299 | Rice | May 19, 1903 |
| 1,185,419 | Lyle | May 30, 1916 |
| 1,234,099 | Lendi | July 17, 1917 |
| 1,457,902 | Gardeen | June 5, 1923 |
| 1,567,761 | Slepian | Dec. 29, 1925 |
| 1,969,093 | Poth | Aug. 7, 1934 |
| 2,155,090 | Janetschke | Apr. 18, 1939 |
| 2,169,031 | Slepian | Aug. 8, 1939 |
| 2,182,628 | Janetschke | Dec. 5, 1939 |
| 2,293,296 | Jonas | Aug. 18, 1942 |
| 2,351,036 | Grant | June 13, 1944 |